US008848377B2

United States Patent
Lu et al.

(10) Patent No.: US 8,848,377 B2
(45) Date of Patent: Sep. 30, 2014

(54) MOUNTING APPARATUS FOR BEZEL

(75) Inventors: Wen-Hu Lu, Shenzhen (CN); Zhan-Yang Li, Shenzhen (CN); Po-Wen Chiu, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 316 days.

(21) Appl. No.: 13/406,471

(22) Filed: Feb. 27, 2012

(65) Prior Publication Data

US 2012/0325993 A1    Dec. 27, 2012

(51) Int. Cl.
| | |
|---|---|
| H05K 7/16 | (2006.01) |
| A47B 81/00 | (2006.01) |
| A47B 97/00 | (2006.01) |
| A47K 1/00 | (2006.01) |
| A47K 5/00 | (2006.01) |
| E04G 5/06 | (2006.01) |
| F16L 3/08 | (2006.01) |
| F21V 21/00 | (2006.01) |
| F21V 35/00 | (2006.01) |
| G06F 1/18 | (2006.01) |

(52) U.S. Cl.
CPC ...................................... G06F 1/181 (2013.01)
USPC .................... 361/726; 312/223.2; 248/221.11

(58) Field of Classification Search
CPC ......... G06F 1/181; G06F 1/184; G06F 1/187; G06F 1/186; G11B 33/128; G11B 33/124; H05K 7/1411; F16M 11/04; F16M 11/041; F16M 11/10; F16M 13/02; A47K 10/10
See application file for complete search history.

(56) References Cited

U.S. PATENT DOCUMENTS

| | | | | |
|---|---|---|---|---|
| 5,513,069 | A * | 4/1996 | Ohgami et al. | 361/679.39 |
| 5,586,003 | A * | 12/1996 | Schmitt et al. | 361/679.58 |
| 6,275,387 | B1 * | 8/2001 | Liao et al. | 361/806 |
| 6,768,652 | B2 * | 7/2004 | DeLuga | 361/801 |
| 7,012,205 | B1 * | 3/2006 | Han | 200/252 |
| 7,254,821 | B2 * | 8/2007 | Chen et al. | 720/655 |
| 7,327,566 | B2 * | 2/2008 | Zhao | 361/679.33 |
| 7,342,798 | B2 * | 3/2008 | Chen et al. | 361/724 |
| 7,365,970 | B2 * | 4/2008 | Cheng et al. | 361/679.55 |
| 7,428,835 | B2 * | 9/2008 | Fan et al. | 70/358 |
| 7,478,889 | B2 * | 1/2009 | Marroquin et al. | 312/223.1 |
| 7,679,017 | B1 * | 3/2010 | Tsai | 200/547 |
| 7,710,715 | B2 * | 5/2010 | Furey et al. | 361/679.02 |
| 7,826,211 | B2 * | 11/2010 | Liu | 361/679.4 |
| 7,916,464 | B2 * | 3/2011 | Chen | 361/679.33 |
| 2004/0100762 | A1 * | 5/2004 | Yuan et al. | 361/685 |
| 2004/0228083 | A1 * | 11/2004 | Wang et al. | 361/683 |

(Continued)

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A mounting apparatus for bezel includes a first mounting structure secured, and a chassis. A plurality of first hooks is defined in the bezel. The chassis includes a first sidewall. The first sidewall defines an installation groove. The first mounting structure includes an installation member, and a locking member slidably installed in the installation member. The installation member is engaged with the plurality of first hooks. The locking member is slidably installed on the installation member. The installation member defines a through hole, and a latching portion is located on the locking member. The latching portion extends through the through hole to be engaged in the installation groove and the latching portion can be disengaged from the installation groove when the locking member slides.

20 Claims, 6 Drawing Sheets

(56) References Cited

U.S. PATENT DOCUMENTS

| | | |
|---|---|---|
| 2005/0040744 A1* | 2/2005 | Chen et al. .................. 312/265.6 |
| 2005/0207108 A1* | 9/2005 | Chen .............................. 361/685 |
| 2005/0213296 A1* | 9/2005 | Cheng et al. .................. 361/683 |
| 2005/0286216 A1* | 12/2005 | Chen et al. .................... 361/683 |
| 2006/0022562 A1* | 2/2006 | Li .............................. 312/223.2 |
| 2007/0013276 A1* | 1/2007 | Chen et al. .................. 312/223.2 |
| 2008/0239646 A1* | 10/2008 | Chen et al. .................... 361/683 |
| 2011/0267774 A1* | 11/2011 | Lin et al. .................. 361/679.58 |

* cited by examiner

US 8,848,377 B2

MOUNTING APPARATUS FOR BEZEL

BACKGROUND

1. Technical Field

The present disclosure relates to mounting apparatuses, and particularly to a mounting apparatus which can secure a bezel to a chassis.

2. Description of Related Art

A bezel is secured to a computer chassis. Typically, the chassis includes two substantially parallel sidewalls. Each of the two sidewalls defines a plurality of through holes. The bezel defines a plurality of screw holes. In assembly, a plurality of screws extends through the plurality of through holes and is screwed into the plurality of screw holes, thereby securing the bezel to the sidewalls. In disassembly of the bezel, the plurality of screws should be removed by screwdriver. But assembling and disassembling the bezel with screws is very inconvenient Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
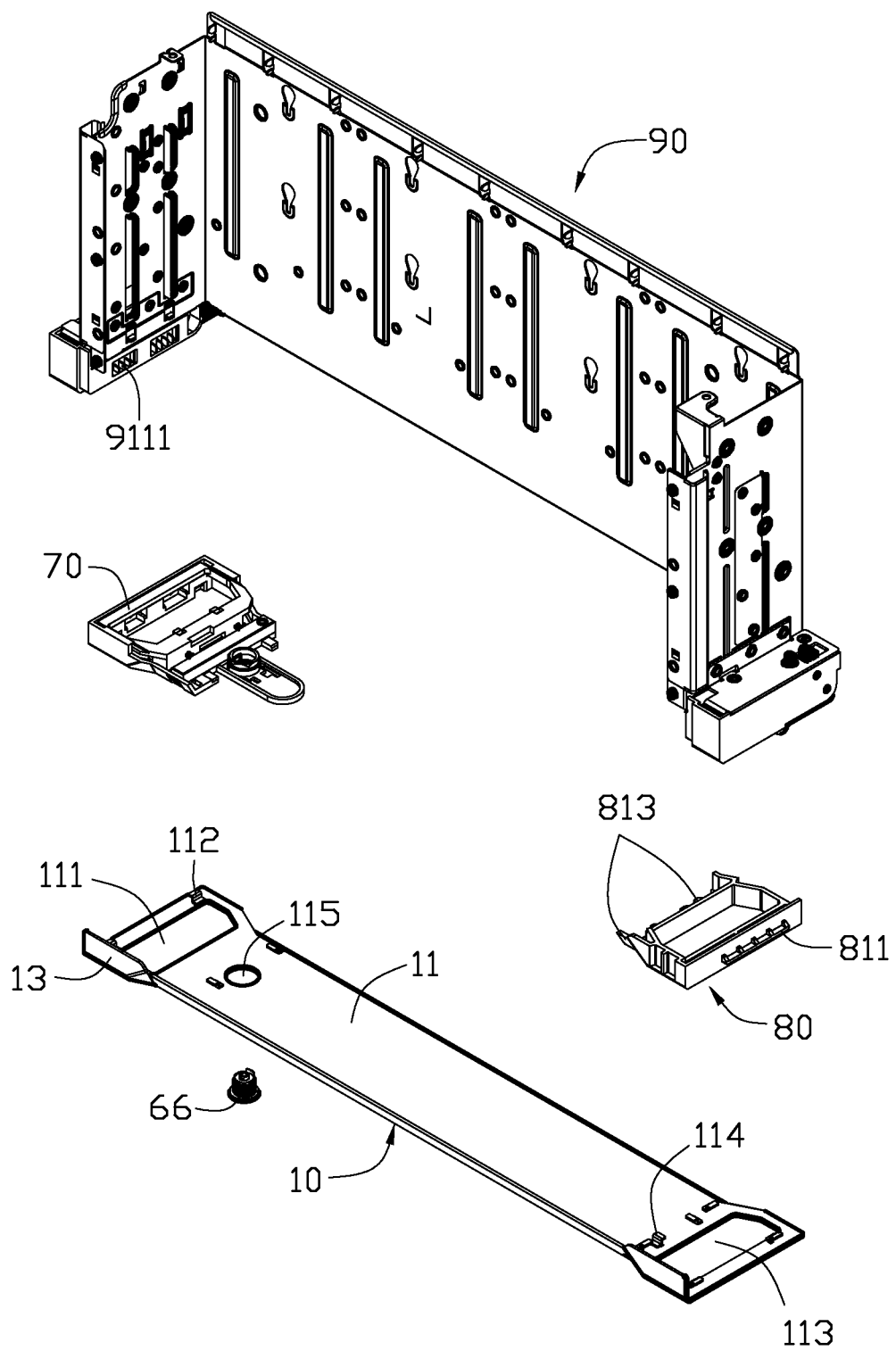
FIG. 1 is an exploded, isometric view of an embodiment of a mounting apparatus and a bezel.

Referring to FIG. 1, a mounting apparatus in accordance with an embodiment includes a first mounting structure 70, a second mounting structure 80, and a chassis 90. The mounting apparatus is configured for securing a bezel 10 to the chassis 90.

Figure 2:
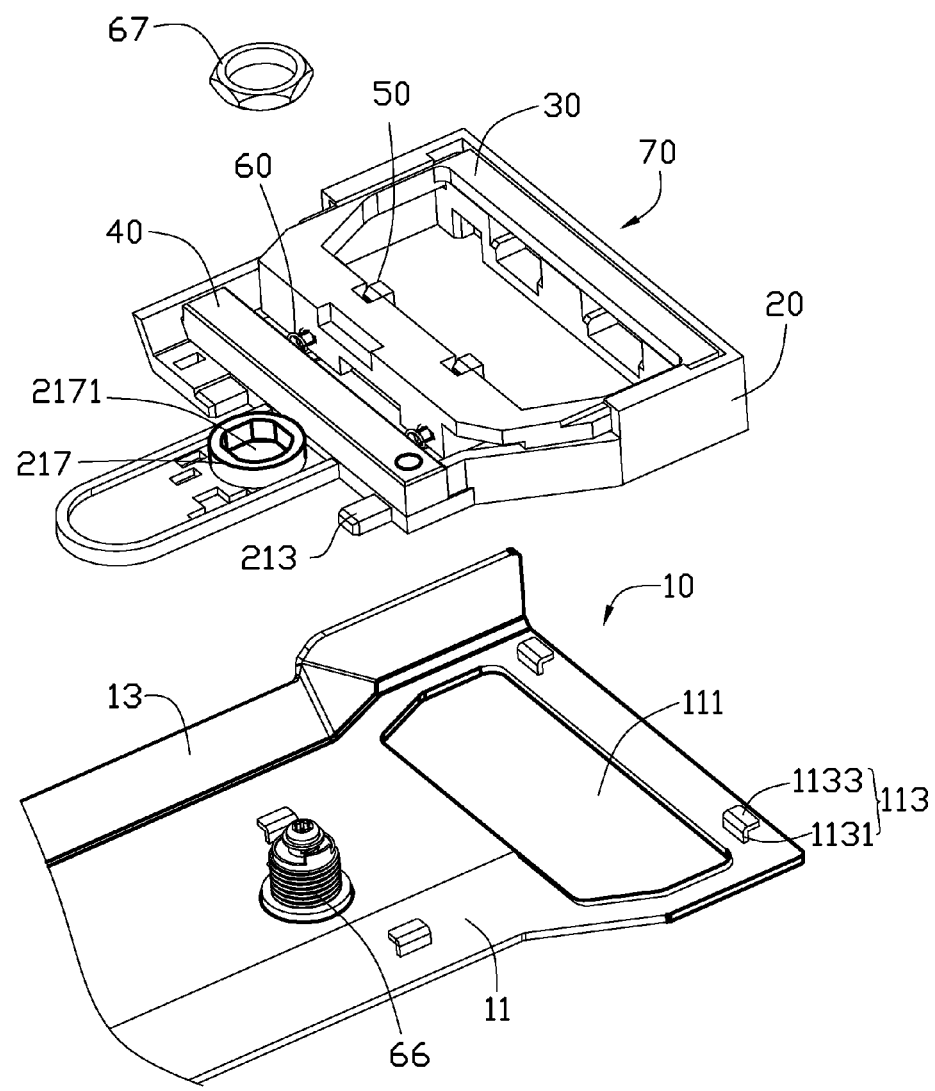
FIG. 2 is a cutaway, exploded, isometric view of a first mounting structure and the bezel of FIG. 1.

The bezel 10 includes a body 11 and a folding edge 13 extending from one side of the body 11. A first opening 111 is defined in one end of the body 11, and a second opening 113 is defined in an opposite end of the body 11. A plurality of first hooks 112 is located on an edge of the first opening 111. A plurality of second hooks 114 is located on the body 11 adjacent to the second opening 113. A securing hole 115 is defined in the body 11 adjacent to the first opening 111. Referring to FIG. 2, each of the plurality of first hooks 112 includes a positioning portion 1131 extending from the body 11 and a stopping portion 1133 extending from the positioning portion 1131. In one embodiment, the positioning portion 1131 is substantially perpendicular to the body 11, and the stopping portion 1133 is substantially perpendicular to the positioning portion 1131. The plurality of second hooks 114 have configuration substantially the same as that of the plurality of first hooks 112.

Figure 3:
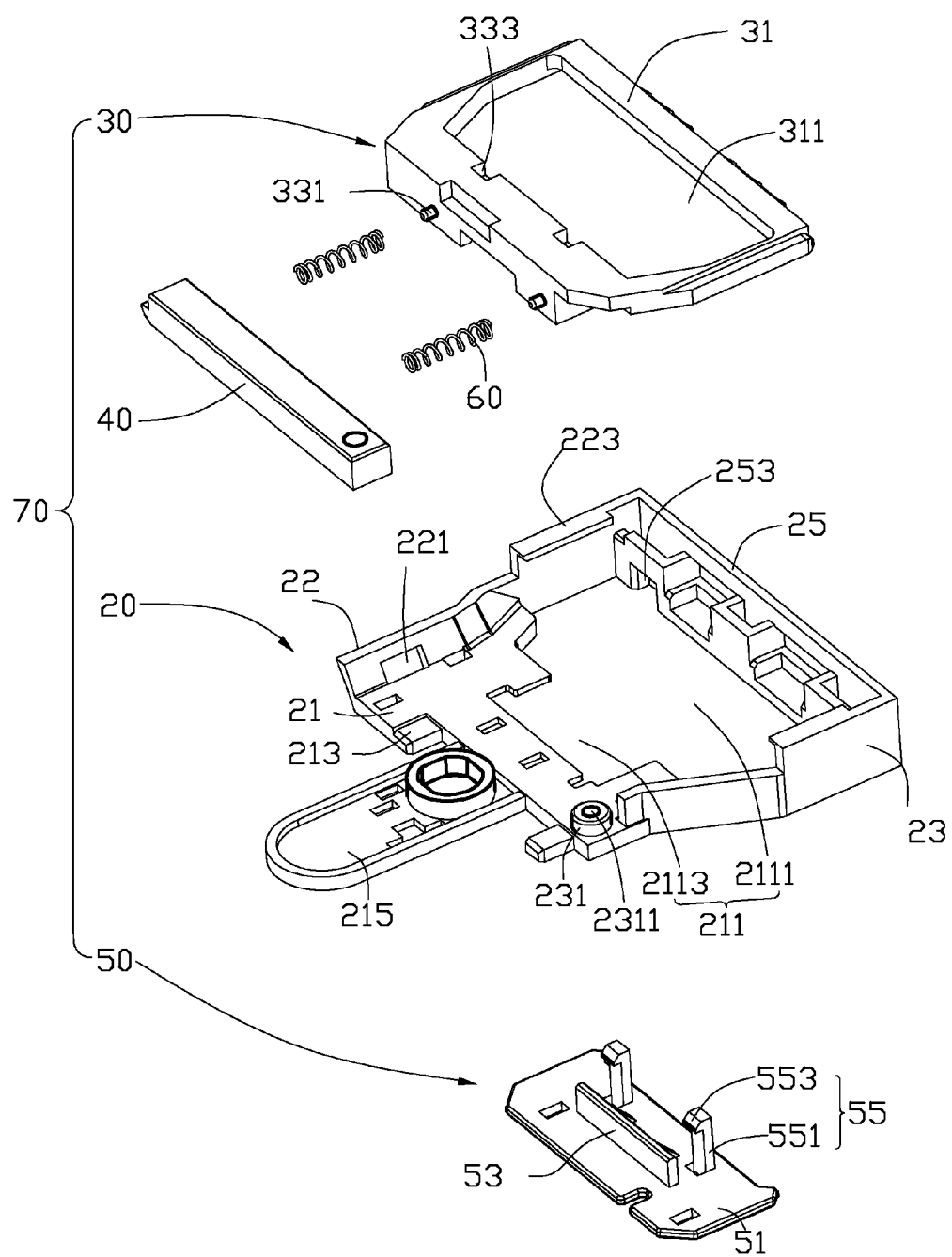
FIG. 3 is an exploded, isometric view of the first mounting structure of FIG. 2.
Figure 4:
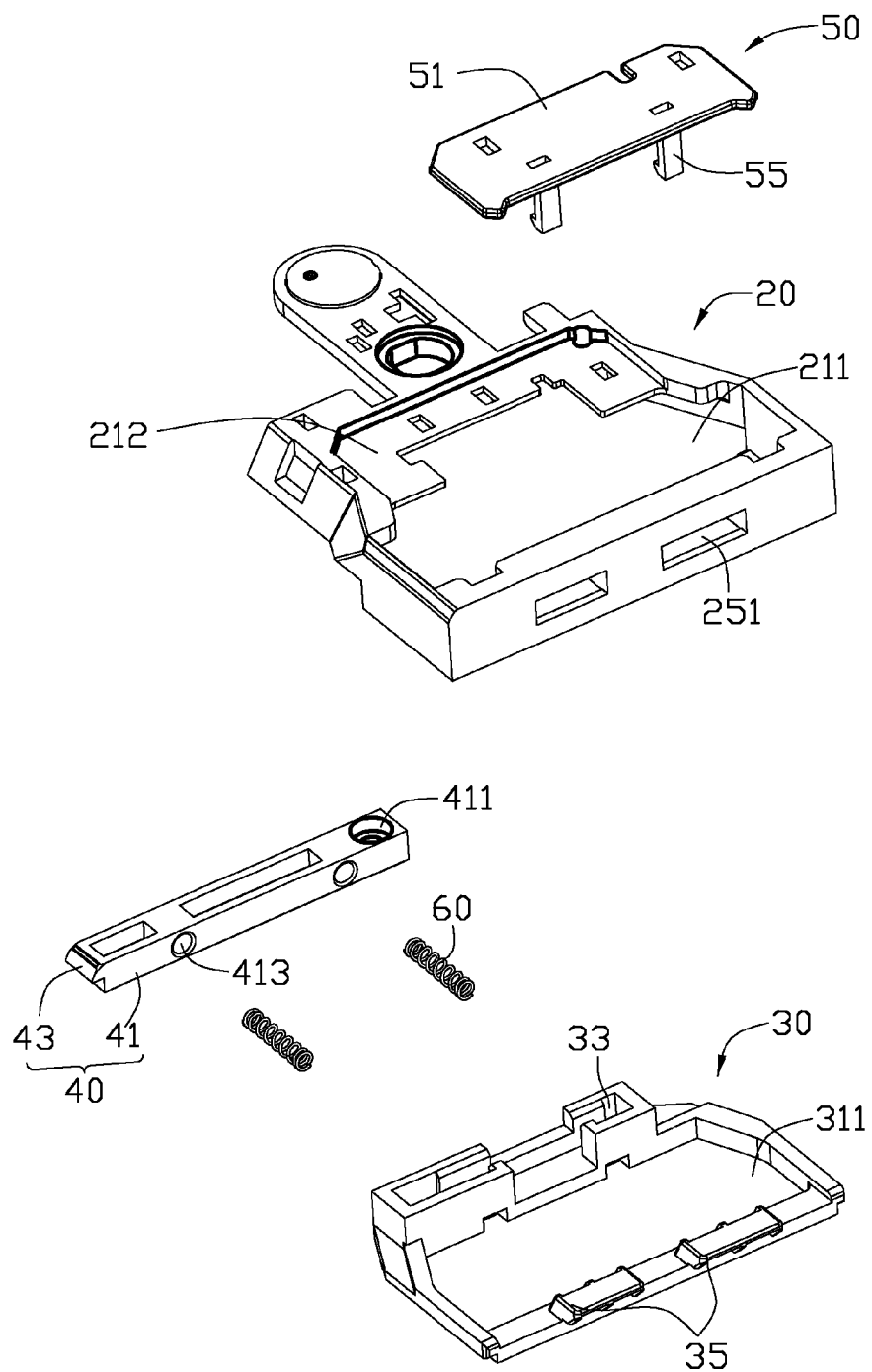
FIG. 4 is similar to FIG. 3, but viewed in a different aspect.

Referring to FIGS. 3-4, the first mounting structure 70 includes an installation member 20, a locking member 30, a blocking member 40, a operating member 50, and two resilient members 60.

The installation member 20 includes a supporting board 21, a first plate 22, a second plate 23, and a backboard 25. The first plate 22 and the second plate 23 are located at two opposite sides of the supporting board 21. The backboard 25 is connected to the first plate 22 and the second plate 23. A third opening 211 is defined in supporting board, and the third opening 211 includes a wide portion 2111 and a narrow portion 2113, communicating with the wide portion 2111. A receiving groove 212 is defined in the back of the supporting board 21. Two latching pieces 213 extend outward from the supporting board 21. An extending piece 215 extends outward from the supporting board 21 between the two latching pieces 213. A positioning pillar 217 is located on the extending piece 215, and a positioning hole 2171 is defined in the positioning pillar 217. The first plate 22 defines an installation hole 221. A securing pillar 231 is located on the supporting board 21, and a screw hole 2311 is defined in the securing pillar 231. A pressing piece 223 extends inward from each of the first plate 22 and the second plate 23. The backboard 25 defines two through holes 251 and two gaps 253. The two gaps 253 communicate with the third opening 211.

The locking member 30 includes a sliding board 31, and the sliding board 31 defines a fourth opening 311. A latching groove 33 (shown in FIG. 4) is defined in the sliding board 31, and two latching portions 35 extend outward from the sliding board 31. The latching groove 33 and the two latching portions 35 are located on two opposite sides of the fourth opening 311. Two protrusion pillars 331 (shown in FIG. 3) extend outward from the latching groove 33. Two positioning grooves 333 are defined in the sliding board 31 and communicate with the fourth opening 311.

The blocking member 40 includes a blocking piece 41 and a limiting piece 43 extending from a first end of the blocking piece 41. A receiving hole 411 is defined in the blocking piece 41. The receiving hole 411 is positioned adjacent to a second end of the blocking piece 41. Two limiting holes 413 (shown in FIG. 4) are defined in an adjacent side of the blocking piece 41. In an embodiment, the blocking piece 41 is cuboid.

The operating member 50 includes a sliding piece 51. A fixing piece 53 extends from the sliding piece 51. In one embodiment, the fixing piece 53 is substantially perpendicular to the sliding piece 51. Two third hooks 55 are located on the sliding piece 51 in the back of the fixing piece 53. Each of the two third hooks 55 includes a connecting portion 551 extending from the sliding piece 51, and a fastening portion 553 extending from the connecting portion 551. In one embodiment, the connecting portion 551 is substantially perpendicular to the sliding piece 51.

Referring to FIG. 1, the second mounting structure 80 includes an installation portion 81. A clamping portion 811 extends outward from the installation portion 81, and two abutting pieces 813 extend outward from the installation portion 81. Two fixing holes (not shown) are defined in the installation portion 81.

The chassis 90 includes a first sidewall 91, a second sidewall 92, substantially parallel with the first sidewall 91, and a rear panel 93, connected to both the first sidewall 91 and the second sidewall 92. A bracket 711 is located on each of the first sidewall 91 and the second sidewall 92, and each of the brackets 711 defines two installation grooves 7111.

Figure 5:
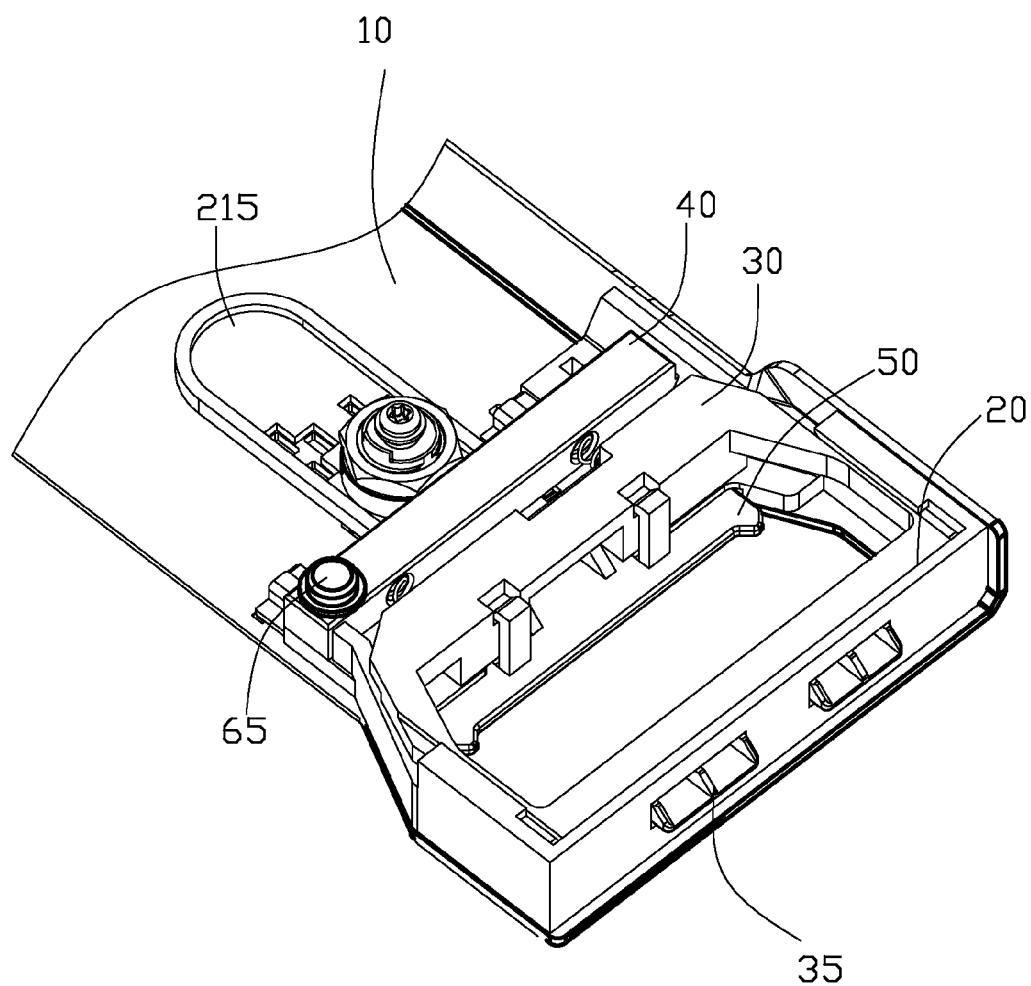
FIG. 5 is a cutaway, assembled view of the first mounting structure and the bezel of FIG. 2.

Referring to FIGS. 2 and 5, in assembly, the locking member 30 is located in front of the installation member 20, and the two latching portions 35 are aligned with the two through holes 251 of the backboard 25. The latching groove 33 is aligned with the supporting board 21. The locking member 30 is moved towards the backboard 25, until the two latching portions 35 extend through the two through holes 251. The locking member 30 is located on the supporting board 21 between the first plate 22 and the second plate 23. The pressing pieces 223 of the first plate 22 and the second plate 23 abut the locking member 30.

The blocking member 40 is placed in front of the locking member 30. The limiting piece 43 is engaged into the installation hole 221 of the first plate 22. The securing pillar 231 is received in the receiving hole 411. A first mounting member 65 extends through the screw hole 2311 to secure the blocking member 40 to the installation member 20. Each end of the two resilient members 60 is located on the two protrusion pillars 331 of the locking member 30, and the opposite ends thereof are engaged in the two limiting holes 413 of the blocking member 40. The two resilient members 60 are located between the blocking member 40 and the locking member 30.

The operating member 50 is placed under the installation member 20. The two third hooks 55 of third hooks 55 of the operating member 50 extend through the wide portion 2111 of the third opening 211 and fourth opening 311, until the two third hooks 55 are engaged in the two positioning grooves 333. The fixing piece 53 extends through the narrow portion 2113 and engages in the latching groove 33. The sliding piece 51 is slidably received in the receiving groove 212.

The first mounting structure 70 is placed above the first opening 111, the positioning hole 2171 is aligned with the securing hole 115 of the body 11, each of the plurality of the first hooks 112 is engaged with each of the two latching pieces 213 (shown in FIG. 4) and two gaps 253, and a second mounting member 66 extends through the securing hole 115 and the positioning hole 2171. A fastener 67, such as a screw, is locked into the second mounting member 66 to secure first mounting structure 70 to bezel 10.

The second mounting structure 80 is placed on the bezel 10 above the second opening 113. The second hooks 114 are engaged with the abutting piece 813 and engaged in the fixing holes. The second mounting structure 80 is thus engaged and secured to the bezel 10.

Figure 6:
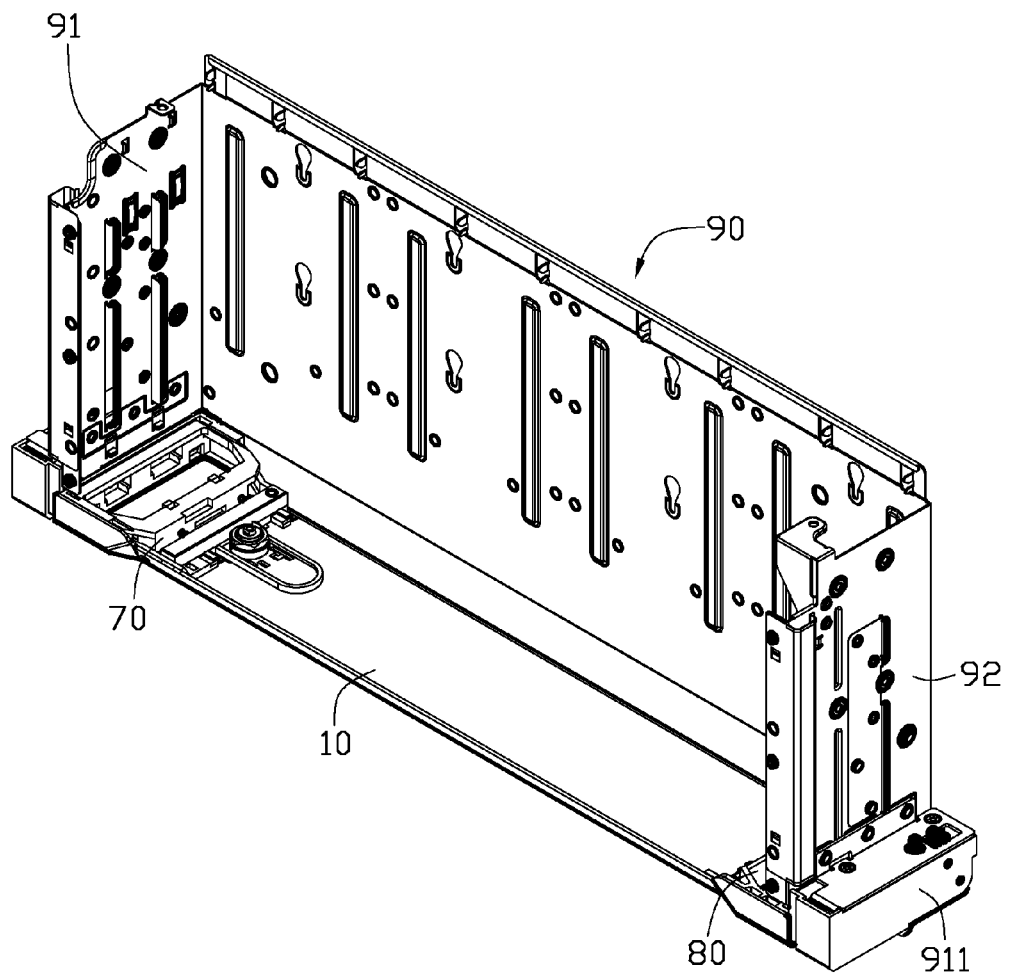
FIG. 6 is assembled view of the mounting apparatus and the bezel of FIG. 1.

Referring also to FIG. 6, in use, the second mounting structure 80 is placed adjacent to the second sidewall 92, and the clamping portion 811 is engaged in the corresponding installation groove 9111 of the second sidewall 92. The operating member 50 is pulled to slide the locking member 30 towards the blocking member 40, until the two latching portions 35 disengage from the two through holes 251. The two resilient members 60 are elastically deformed. When the two through holes 251 are aligned with the two installation grooves 9111 of the first sidewall 91, the operating member 50 is released, and the two resilient members 60 elastically return to bias the locking member 30 to slide towards the backboard 25. The two latching portions 35 extend through the two through holes 251 and are engaged in the two installation grooves 9111. Thereby, the bezel 10 is secured to the chassis 90.

In disassembly, the operating member 50 is pulled to bias the locking member 30 to slide towards the locking member 40, until the two latching portions 35 disengage from the two installation grooves 9111. Thereby, the bezel 10 is easily removed from the chassis 90.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A mounting apparatus comprising:
   a bezel;
   a chassis, the chassis comprising a first sidewall, and the first sidewall defining an installation groove;
   a first mounting structure, the first mounting structure comprising an installation member, a locking member, a blocking member and a resilient member; the installation member defining a through hole, the locking member is secured to the bezel, the locking member comprising a latching portion, and the locking member is slidably engaged in the installation member, the blocking member secured to the installation member, and the resilient member elastically engaged between the locking member and the blocking member;
   wherein the locking member can be slid between a first position and a second position; when the locking member is in the first position, the latching portion extends through the through hole to be engaged in the installation groove; when the locking member is in the second position, the latching portion is disengaged from the installation groove; the resilient member is adapted to be elastically deformable to move the installation member from the second position to the first position.

2. The mounting apparatus of claim 1, wherein the locking member comprises a protrusion pillar; the blocking member defines a limiting hole; and a first end of the resilient member is located on the protrusion pillar, and a second end of the resilient member is engaged in the limiting hole.

3. The mounting apparatus of claim 1, wherein the first mounting structure further comprise an operating member, the operating member comprises a sliding piece, the installation member comprises a supporting board, the supporting board defines a receiving groove, and the sliding piece is slidably received in the receiving groove.

4. The mounting apparatus of claim 3, wherein a third opening is defined in the supporting board, for the operating member extending through, and the third opening comprises a wide portion and a narrow portion communicating with the wide portion.

5. The mounting apparatus of claim 4, wherein the locking member defines a latching groove, a fixing piece extends from the sliding piece, and the fixing piece extends through the narrow portion to engage in the latching groove.

6. The mounting apparatus of claim 5, wherein the fixing piece is substantially perpendicular to the sliding piece.

7. The mounting apparatus of claim 4, wherein a third hook extends from the sliding piece, the locking member defines a fourth opening and a positioning groove communicating the fourth opening, and the third hook extends through the wide portion and the fourth opening to engage in the positioning groove.

8. The mounting apparatus of claim 3, wherein the installation member further comprises a backboard, and the locking member is slidably engaged between the blocking member and the backboard.

9. The mounting apparatus of claim 8, wherein the blocking member further comprises a limiting piece; and the installation member comprises a first plate connected to the backboard, and the first plate defines an installation hole; and the limiting piece is engaged in the installation hole.

10. The mounting apparatus of claim 9, wherein the blocking member defines a receiving hole, a securing pillar is located on the supporting board, and the securing pillar is received in the receiving hole.

11. A mounting apparatus comprising:
a bezel, a plurality of first hooks located on the bezel;
a chassis, the chassis comprising a first sidewall, and the first sidewall defines an installation groove;
a first mounting structure, the first mounting structure comprising an installation member and a locking member, the installation member is engaged with the plurality of first hooks, the locking member is slidably installed on the installation member, the installation member defines a through hole, and a latching portion located on the locking member; and
wherein the latching portion extends through the through hole to be engaged in the installation groove and the latching portion is capable of disengaging from the installation groove when the locking member is slid relative to the installation member.

12. The mounting apparatus of claim 11, wherein the first mounting structure further comprises a blocking member and a resilient member, and the resilient member is between the blocking member and the locking member, for biasing the locking member to be slid relative to the installation member.

13. The mounting apparatus of claim 12, wherein the locking member comprises a protrusion pillar, the blocking member defines a limiting hole; and an end of the resilient member is located on the protrusion pillar and an opposite end of the resilient member is engaged in the limiting hole.

14. The mounting apparatus of claim 12, wherein the first mounting structure further comprise a operating member, the operating member comprises a sliding piece, the installation member comprises a supporting board, the supporting board defines a receiving groove, the sliding piece is slidably received in the receiving groove.

15. The mounting apparatus of claim 14, wherein a third opening is defined in the supporting board, for the operating member through, and the third opening comprises a wide portion and a narrow portion communicating with the wide portion.

16. The mounting apparatus of claim 15, wherein the locking member defines a latching groove, a fixing piece extends from the sliding piece, and the fixing piece extends through the narrow portion to engage in the latching groove.

17. The mounting apparatus of claim 15, wherein a third hook extends from the sliding piece, the locking member defines a fourth opening and a positioning groove communicating the fourth opening, the third hook extends through the wide portion and the fourth opening to engaged in the positioning groove.

18. The mounting apparatus of claim 12, wherein the installation member further comprises a backboard, and the locking member is slidably engaged between the blocking member and the backboard.

19. The mounting apparatus of claim 14, wherein the blocking member further comprising a limiting piece, the installation member comprises a first plate, the first plate defines an installation hole, the limiting piece is engaged in the installation hole; the blocking member defines a receiving hole, a securing pillar is located on the supporting board, and the securing pillar is received in the receiving hole.

20. The mounting apparatus of claim 11, wherein the mounting apparatus further comprises a second mounting structure secured to the bezel, the chassis comprises a second sidewall, and the second mounting structure is engaged with the second sidewall.

* * * * *